United States Patent
Park et al.

(10) Patent No.: US 8,612,701 B1
(45) Date of Patent: Dec. 17, 2013

(54) METHOD AND APPARATUS FOR ACCESSING A TAPE DRIVE FROM A PLURALITY OF NODES

(75) Inventors: Adonijah Park, Forest Lake, MN (US); Raymond Wesley Gilson, Saint Paul, MN (US)

(73) Assignee: Symantec Corporation, Mountain View, CA (US)

( * ) Notice: Subject to any disclaimer, the term of this patent is extended or adjusted under 35 U.S.C. 154(b) by 415 days.

(21) Appl. No.: 12/005,134

(22) Filed: Dec. 21, 2007

(51) Int. Cl.
*G06F 12/00* (2006.01)

(52) U.S. Cl.
USPC .................... 711/162; 711/E12.103; 711/154

(58) Field of Classification Search
None
See application file for complete search history.

(56) References Cited

U.S. PATENT DOCUMENTS

| | | | |
|---|---|---|---|
| 5,950,218 A * | 9/1999 | Howard | 711/4 |
| 6,385,706 B1 * | 5/2002 | Ofek et al. | 711/162 |
| 6,618,795 B2 * | 9/2003 | Chan et al. | 711/162 |
| 2003/0188108 A1 * | 10/2003 | Damron et al. | 711/147 |
| 2005/0149684 A1 * | 7/2005 | Sankaran et al. | 711/162 |
| 2006/0248038 A1 * | 11/2006 | Kaplan et al. | 707/1 |

* cited by examiner

*Primary Examiner* — Larry Mackall
(74) *Attorney, Agent, or Firm* — Campbell Stephenson LLP

(57) ABSTRACT

Embodiments of the present invention comprise a method and apparatus for performing data backup from multiple nodes of a computer network. In one or more embodiments, the method of performing a data backup from multiple nodes of a computer network comprising generating a control message within a control node and, in response to the control message, enabling two or more nodes of the multiple nodes to access a tape drive concurrently.

19 Claims, 4 Drawing Sheets

US 8,612,701 B1

METHOD AND APPARATUS FOR ACCESSING A TAPE DRIVE FROM A PLURALITY OF NODES

BACKGROUND

1. Technical Field

Embodiments of the present invention generally relate to data protection systems. More particularly, embodiments of the present invention relate to a method and apparatus for concurrently accessing a tape drive from a plurality of nodes.

2. Description of the Related Art

Typically, in large to mid-sized organizations, multiple computing nodes are used to host various resources (e.g., software applications, storage resources, network resources and the like) for a plurality of client computers. The multiple nodes are also employed for performing a backup process for data related to the nodes and/or the client computers. The backup process is an important activity for protecting sensitive data (e.g., data that is confidential, privileged and/or critical to the organization). As such, the backup process may be conducted on a periodic basis to ensure preservation of the sensitive data. Most of the time, an organization employs several dedicated servers for performing regular data backups to ensure reservation of the sensitive data.

Data backed up during the backup process is generally stored on a storage device (e.g., a tape drive, a disk drive and the like). A tape drive is able to write (i.e. stream) data onto a media (e.g., magnetic tape) at a faster rate than the multiple nodes are able to communicate the data to the tape drive. As speeds of typical tape drives increase, a single node may not have a sufficient Input/Output (I/O) bandwidth to keep the tape drive or multiple tape drives streaming (i.e., writing) to the media at the faster transfer rate (e.g., I/O rate). This results in inefficient utilization of the tape drive and reduction of an overall backup rate of a typical backup process.

Furthermore, the tape drive is prevented or disrupted from streaming the data to the tape due to insufficient I/O bandwidth at the single node. When the transfer rate of the data falls below a minimum threshold at which heads associated with the tape drive were designed to transfer data to a running tape (e.g., shoe-shining effect), the tape drive must decelerate the running tape, stop the running tape, rewind the running tape, accelerate again to a proper speed and resume streaming from a same position. Disruptions to the streaming of data wastes available tape space, causes latency and results in overuse of the media.

According to one of typical method, multiplexing is performed on the single node using threads in an effort to improve the transfer rate of the data to the running tape. However, the single node may still be limited to an insufficient I/O rate. Hence, the above mentioned problem still persists because the single node can only transfer data at or below its I/O rate, which is substantially below the speed of a tape drive despite any improvement to the transfer rate caused by the multiplexing. Moreover, nodes that have a sufficient I/O bandwidth to keep the tape drive streaming are too expensive to be used for performing the backup process by most organizations.

Accordingly, there exists a need in the art for a method and apparatus for accessing a tape drive from a plurality of nodes in a manner that normalizes a data transfer rate to the tape drive.

SUMMARY

Embodiments of the present invention comprise a method and apparatus for performing data backup from multiple nodes of a computer network. In one or more embodiments, the method of performing a data backup from multiple nodes of a computer network comprising generating a control message within a control node and, in response to the control message, enabling two or more nodes of the multiple nodes to concurrently access a tape drive.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
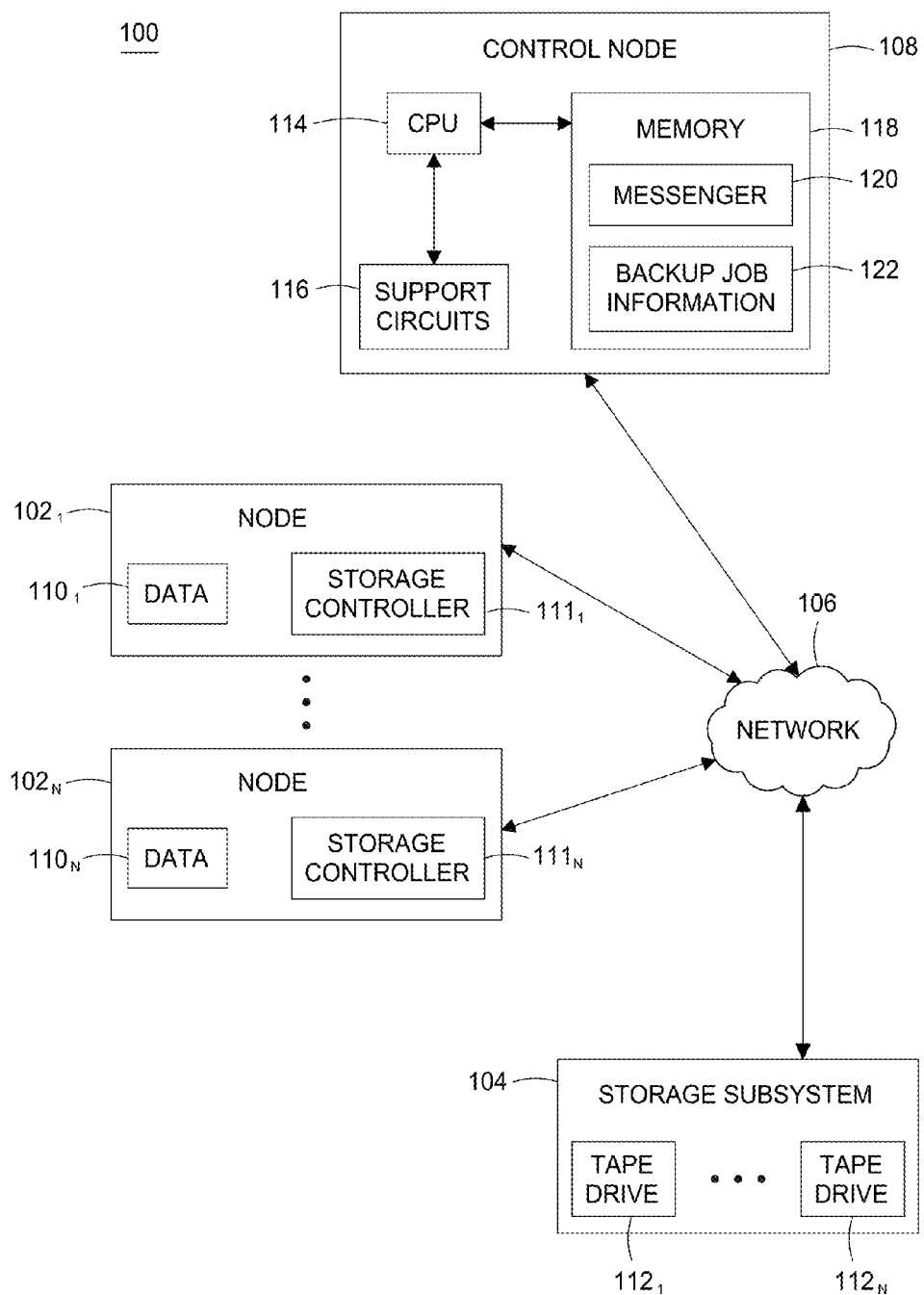
FIG. 1 is a block diagram of a system for controlling a plurality of nodes in accordance with one or more embodiments of the present invention.

FIG. 1 is a block diagram of a system 100 for controlling a plurality of nodes. The system 100 comprises a plurality of nodes 102, a storage subsystem 104 and a control node 108, each coupled to one another through a network 106. The control node 108 communicates with the plurality of nodes 102. It is appreciated that various embodiments of the present invention include the system 100 where the control node 108 does not have access to the storage subsystem 104 and is coupled directly to the plurality of nodes 102 (e.g., through a Ethernet-based communication system).

The plurality of nodes 102 (illustrated as Node $102_1$ . . . Node $102_n$) is, herein, referred to as nodes 102. The nodes 102 are various computers (e.g., a client computer, a server computer and the like). Notably, a node $102_i$ of the nodes 102 comprises data $110_i$ and a storage controller $111_i$. In one or more embodiments, the node $102_i$ uses one or more Small Computer System Interface (SCSI) persistent reservation commands to set up shared write to the tape drive 112 and perform a backup job.

The storage subsystem 104 includes a plurality of storage volumes, such as a plurality of tape drives 112 for storing data for data protection tasks (e.g., backup or restore). The plurality of tape drives 112 is illustrated as tape drive $112_1$ . . . tape drive $112_n$ (hereinafter the tape drives 112). In operation, the storage subsystem 104 facilitates the performance of backup jobs and storage of the data 110 from the nodes 102 to the tape drives 112. In one embodiment, a shared access established on a tape drive $112_i$ enables concurrent access (e.g., concurrent streaming of data) from two or more nodes of the nodes 102, as explained further below.

The network 106 comprises a communication system that connects a computer system by wire, cable, fiber optic and/or wireless link facilitated by various types of well-known network elements, such as hubs, switches, routers, and the like. The network 106 may employ various well-known protocols to communicate information amongst the network resources. For example, the network 106 may be a part of the intranet using various communications infrastructure such as Ethernet, WiFi, WiMax, General Packet Radio Service (GPRS), and the like.

The storage controllers 111 within the nodes 102 use SCSI persistent reservation (SCSI-PR) commands to enable the concurrent streaming (i.e., writing) to a same tape drive of the tape drives 112 by two or more nodes of the nodes 102. In one or more embodiments, the storage controller 111 communicates one or more SCSI-PR commands to the storage subsystem 104 through the network 106. In one embodiment, when the SCSI-PR commands are executed within the storage subsystem 104, either a shared write or an exclusive write is setup on the same tape drive based on an occurrence of various events, as explained further below. If the same tape drive is setup as the shared write, multiple nodes are permitted to access the same tape drive concurrently.

The control node 108 comprises a central processing unit (CPU) 114, various support circuits 116 and a memory 118. The CPU 114 may comprise one or more commercially available microprocessors or microcontrollers that facilitate data processing and storage. The various support circuits 116 facilitate operation of the CPU 114 and comprise at least one of clock circuits, power supplies, cache, input/output circuits, and the like. The memory 118 comprises at least one of read only memory (ROM), random access memory (RAM), disk drive storage, optical storage, removable storage, and the like. The memory 118 further includes various software packages, such as a messenger 120. The memory 118 further includes various data, such as backup job information 122.

The backup job information 122 comprises information regarding one or more backup jobs to be performed on the tape drive 112 in the storage subsystem 104. For example, the backup job information 122 indicates a number of backup jobs and a size of data associated with each backup job. In one embodiment, the control node 108 uses the backup information 122 to select a particular node of the nodes 102 to perform a certain backup job.

The messenger 120 is a software package stored and executed by the control node 108. The messenger 120 is configured to generate and communicate a control message to one or more nodes of the nodes 102. In one embodiment, the messenger 120 determines a first node of the nodes 102 to perform a backup job on a first tape drive. The messenger 120 generates the control message using one or more instructions for the first node. The first node may be instructed to set the reservation on the first tape drive to shared access or exclusive reservation. Furthermore, the first node may be provided a Reservation Key required for accessing the first tape drive through a reservation, as explained below. In one or more embodiments, the messenger 120 communicates the control message to the one or more nodes of the nodes 102 in case of an occurrence of an event at the tape drives 112 (e.g., an end of media, a new backup job, a finished backup job or the like). In one embodiment, the messenger 120 communicates the control message to a node of the nodes 102 to establish a primary node, as described below. In another embodiment, the messenger 120 communicates the control message to the one or more nodes of the nodes 102 to instruct the one or more nodes to use SCSI-PR commands to setup an exclusive write or a shared write on one or more tape drives of the tape drives 112.

In operation, if a first node is chosen to perform a first backup job on a first tape drive, the first node must use SCSI-PR commands to register with the first tape drive under a Reservation Key. There is now a reservation in the first tape drive for the first node. The first node can set the reservation type to shared or exclusive. If the control node 108 selects a second node to perform a second backup job on the first tape drive, then the second node must use SCSI-PR commands to register with the first tape drive. The Reservation Key may be used by the first tape drive to exclude any other node from accessing the tape drive. In one embodiment, if a third node attempts to write to the first tape drive, the third node will first verify that the reservation is set to shared write otherwise the third node will not write to the tape drive. Hence, only the first and second nodes are concurrently writing data blocks to the first tape drive. Metadata is also written to the first tape drive to indicate that data blocks from the first and the second backup jobs are stored on the first tape drive. Furthermore, each data block includes an identifier for the either the first or second backup job.

The SCSI-PR commands used by any of the nodes 102 include a Persistent Reserve In command and a Persistent Reserve Out command. The Persistent Reserve In command is used to obtain information about persistent reservations and reservation keys that are active on any of the tape drives 112. The Persistent Reserve Out command is used by any of the nodes 102 to register with, create a reservation, release a reservation to any of the tape drives 112. The Persistent Reserve Out command may also be used to preempt a reservation by another node and clear each and every reservation key and reservation from any of the tape drives 112.

In one or more embodiments, the control node 108 processes the backup job information 122, generates and communicates a control message to one or more nodes of the nodes 102 where one or more controllers of the controllers 111 enable the one or more nodes to access one or more tape drives of the tape drives 112 in response to the control message. In one embodiment, the control node 108 coordinates the performance of backup jobs by the nodes 102. In another embodiment, the control message comprises instructions regarding the performance of the backup jobs on the tape drives 112. For example, the control message may include instructions as to which node will perform the backup job, which tape drive will store data associated with the backup job or when the backup job is scheduled for performance. In another embodiment, the control node 108 handles the various events (e.g., end of media, new backup job, or finished backup job) that occur during the performance of backup jobs using the control message.

According to various embodiments, a primary node is identified and/or established by the control node 108 in case of an occurrence of an event. In one embodiment, the messenger 120 communicates a control message to establish the primary node amongst the nodes 102. In one or more embodiments, the primary node is instructed to use SCSI-PR commands to change a particular tape drive of the tape drives 112 from a shared write reservation type to an exclusive write reservation type. Accordingly, the primary node becomes the only node of the nodes 102 that is permitted to write to the particular tape drive.

For example, if any of the various events occurs, then the control node 108 communicates a control message that instructs the nodes 102 to stop writing to a first tape drive. In one embodiment, the control node 108 communicates a control message that assigns the primary node out of the nodes 102. In one embodiment, the primary node requests information regarding one or more image files that are currently being written to the first tape drive. Then, the control 108 generates and communicates a control message that includes such requested information. The primary node uses a portion of the requested information as metadata.

If the event is an end of media signal, the primary node selects a second tape drive of the tape drives 112 for performance of the backup jobs. A controller within the primary node switches to the second tape drive, uses SCSI-PR commands to set a reservation of the second tape drive to shared write, and informs the control node 108 of the shared write. The control node 108 updates the backup information 122 with information regarding the second tape drive. Then, the control node 108 communicates a control message to the nodes 102 that includes the updated backup information 122 and instructs the nodes 102 to use the second tape drive for backup jobs scheduled for the first tape drive.

If the event is a new backup job or a finished backup job, the primary node writes metadata to the first tape drive. In one embodiment, the primary node sets the first tape drive to exclusive write prior to writing the metadata to prevent another other computing device from writing to the first tape drive. Once the metadata is written, the primary node then sets the first tape drive to shared write (i.e. shared access reservation type) and informs the control node 108. In another embodiment, the primary node determines a position (e.g., current position) of the first tape drive and then, writes the metadata after the determined position without changing the reservation type from shared write to exclusive write. The control node 108 updates the backup job information 122 with the new backup job or the finished backup job. The control node 108 then sends a control message that instructs the node 102 to continue performing backup jobs.

The metadata indicates that one or more backup jobs are operating with the tape drive. The metadata facilitate restorations of data associated with the new backup job or the finished backup job from the tape drives 112. For example, the metadata provides locations of the data associated with the new or finished backup jobs. In another embodiment, each data block that is written during performance of a particular backup job includes an identifier that indicates the particular backup job. Thus, a restoration process uses the metadata and/or the identifier to locate and access (e.g., read) data requested to be restored.

Figure 2:
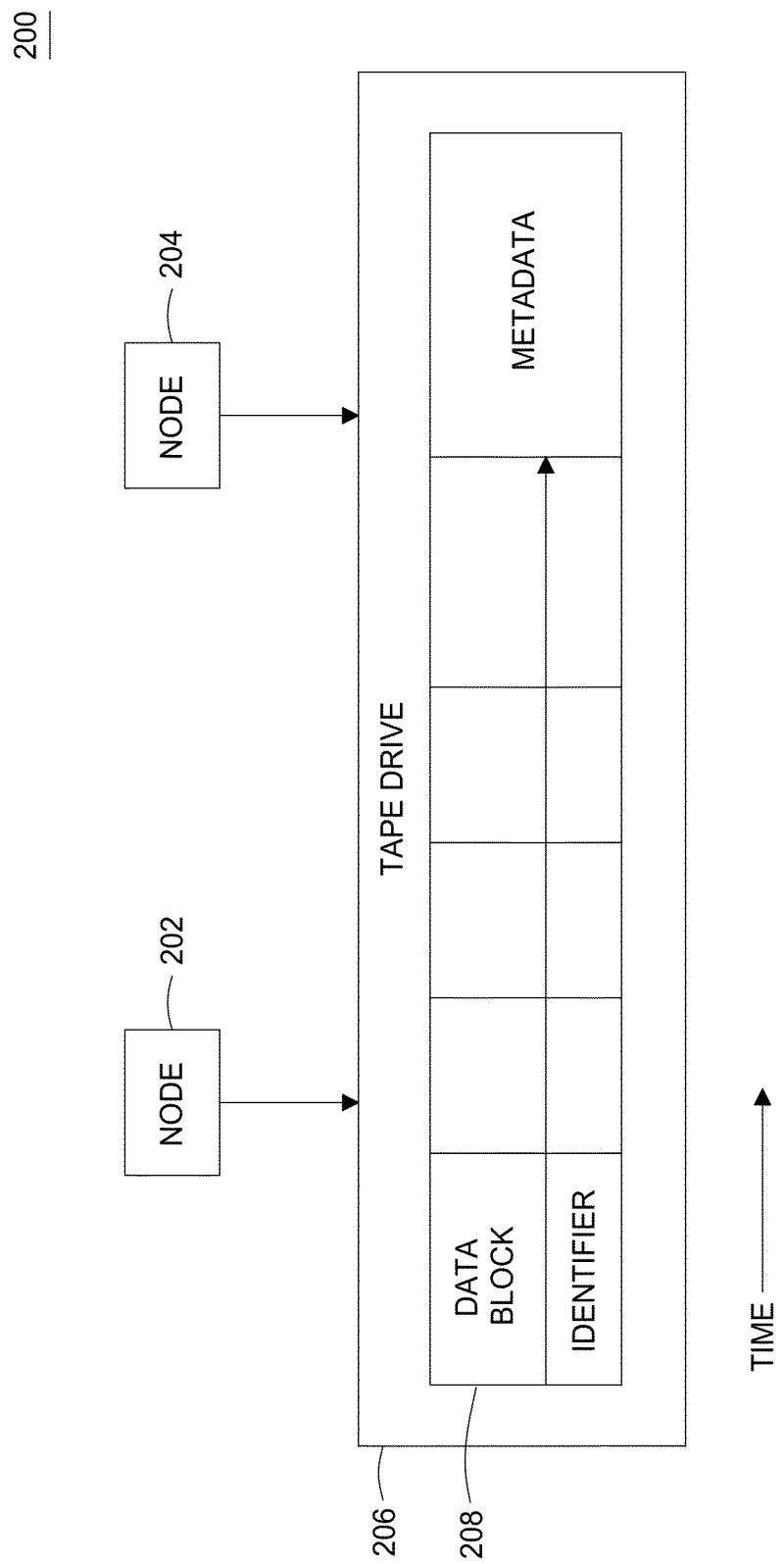
FIG. 2 is functional block diagram that depicts concurrent access by one or more nodes to a tape in a tape drive in accordance with one or more embodiments of the present invention.

FIG. 2 is a functional block diagram that depicts concurrent access by a node 202 and a node 204 to tape 208 in a tape drive 206. As mentioned above, the tape drive 206 is a device that streams data to the tape 208. In operation, the tape drive 206 receives data blocks from the node 202 and the node 204 concurrently (e.g., within a same time period). Furthermore, each data block is streamed to the tape 208 along with an identifier. The identifier denotes a backup job associated with the data block and/or a node that was assigned the backup job.

When either the node 202 or the node 204 finishes a backup job or receives a new backup job, the node 202 and the node 204 are instructed to stop communicating data blocks to the tape drive 206. As a result, streaming to the tape 208 halts. The node 202 or the node 204 communicates metadata to the tape drive 208 to be streamed to the tape 206 before any more data blocks are written. The metadata indicates one or more backup jobs being performed on the tape 208 concurrently. For example, the metadata may indicate that a first backup has finished and a second backup job will continue to be performed on the tape 208. As another example, the metadata may indicate that a third backup job (i.e., new) will be streamed to the tape 208 concurrently with the first and the second backup jobs. The metadata also indicates locations of the data blocks on the tape 208 that belong to a particular backup job.

Figure 3:
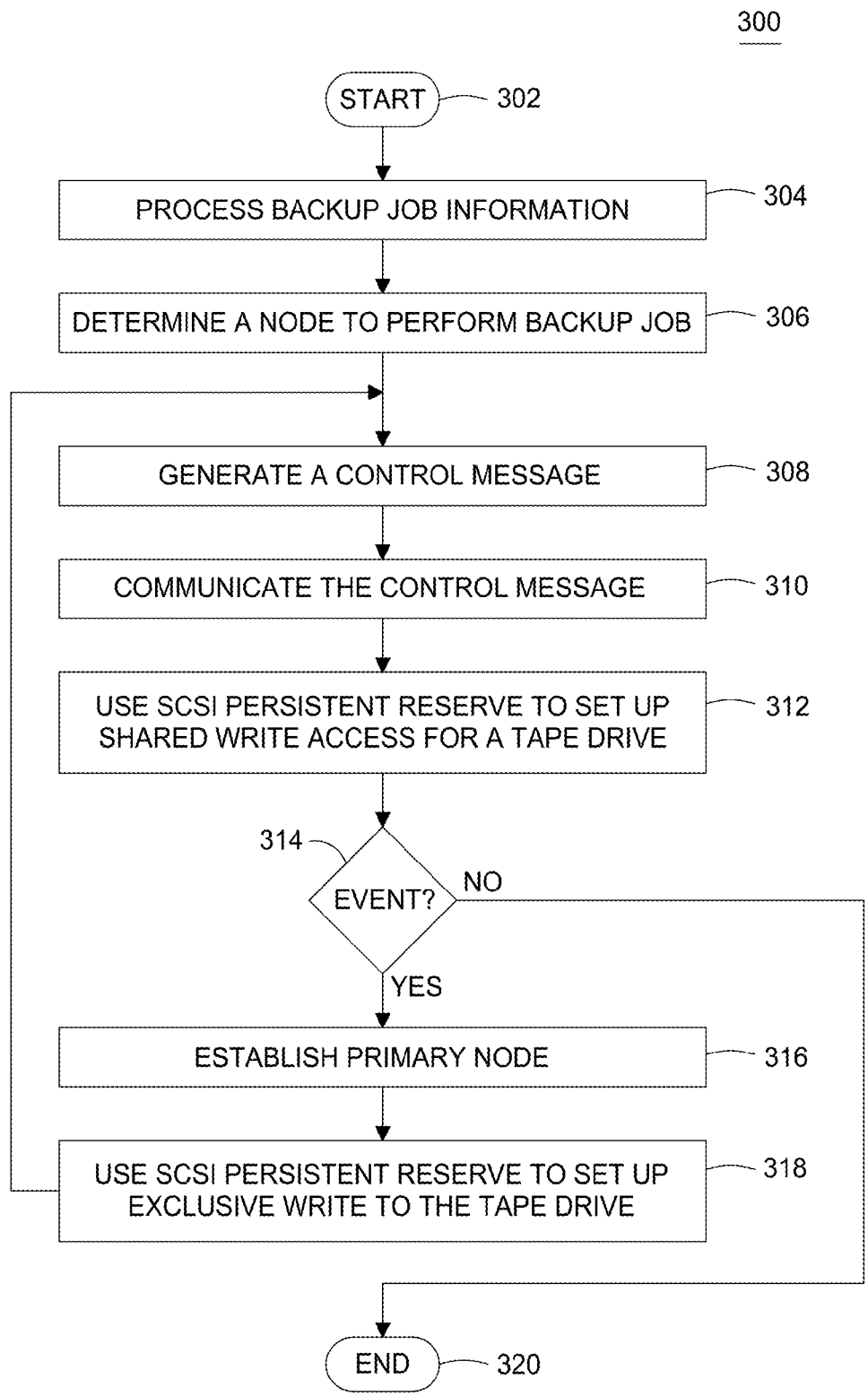
FIG. 3 is a flow diagram of a method for performing a plurality of backup jobs by a plurality of nodes in accordance with one or more embodiments of the present invention.

FIG. 3 is a flow diagram of a method 300 for performing a plurality of backup jobs by the plurality of nodes. The method 300 starts at step 302 and proceeds to step 304, at which backup job information is processed. At step 306, a node to perform a backup job is determined out of the plurality of nodes.

At step 308, a control message is generated. As described above, control messages are used to coordinate the performance of the plurality of backup jobs. At step 310, the control message is communicated to one or more nodes of the plurality of the nodes. At step 312, SCSI-Persistent Reserve is used to set a tape drive to shared write. In one embodiment, a control node instructs a storage controller of a node to use SCSI-PR commands to setup shared access to the tape drive. If the tape drive is set to shared write, two or more nodes have permission to write to the tape drive (i.e., nodes that have shared write permission) but any other node is not allowed to write to the tape drive (i.e., nodes that do not have shared write permission). The shared write prevents the any other node (e.g., outside of the control of the control node) from overwriting any data stored on the tape drive during the performance of the plurality of backup jobs. Accordingly, data being backed up is protected for future restoration.

At step 314, a determination is made whether there is an occurrence of an event (e.g., end of media, new backup job, or finished backup job). If, it is determined that an event has occurred (option "YES") then the method 300 proceeds to step 316. At step 316, a primary node is established. At step 318, the SCSI-Persistent Reserve is used to set up exclusive write on the tape drive. In one or more embodiments, the primary node changes the tape drive from shared write to exclusive write and becomes the only node permitted to write to the tape drive. Once the exclusive write is setup, the primary node handles the various events, as described above. For example, the primary node switches to another tape drive if an end of media has been reached at the tape drive. As another example, the primary nodes writes metadata to the tape drive if a new backup job has arrived or a backup job has finished. After step 318, the method 300 returns to step 308. If, at step 314, it is determined that no event has occurred (option "NO") then the method 300 proceeds to step 320. The method 300 ends at step 320.

Figure 4:
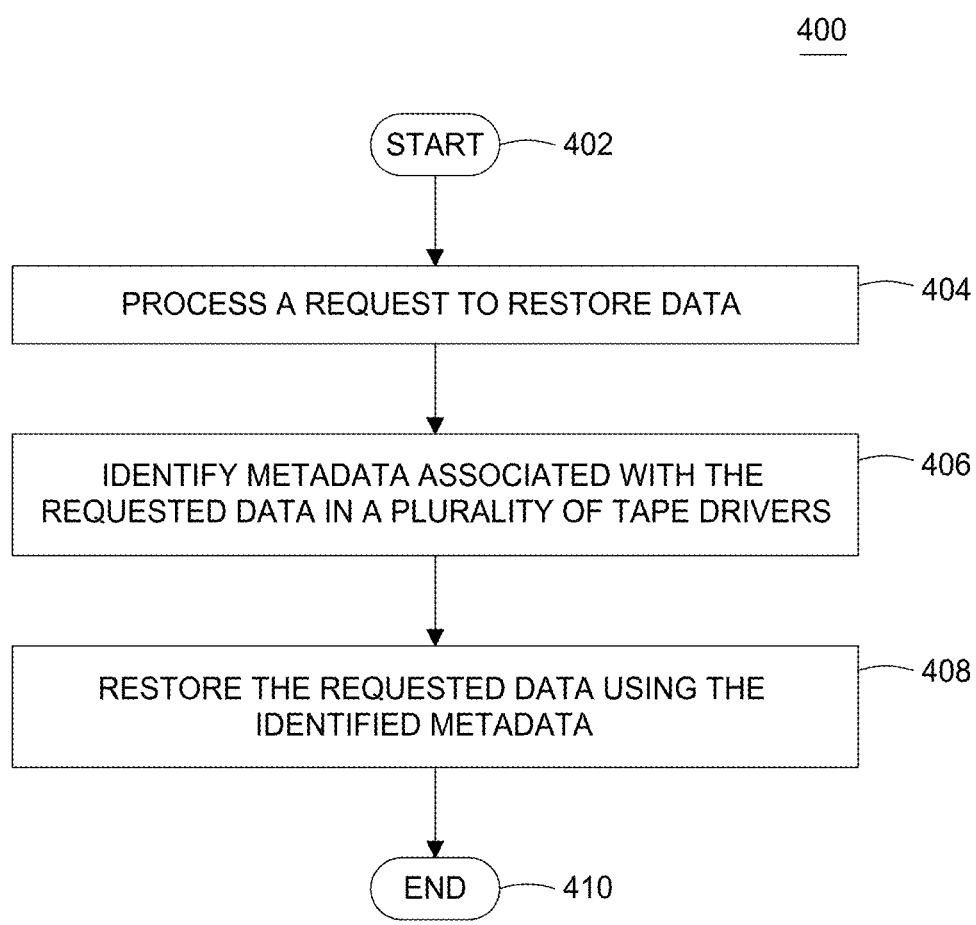
FIG. 4 is a flow diagram of a method for restoring data using metadata in accordance with one or more embodiments of the present invention.

FIG. 4 is a flow diagram of a method 400 for restoring data using metadata. The method 400 starts at step 402 and proceeds to step 404, at which a request to restore data is processed. In one embodiment, a storage controller processes the request. In another embodiment, the request initiates a restoration process at a tape drive. At step 406, metadata associated with the requested data is identified in a plurality of tape drives. The metadata comprises information indicating locations of data blocks that comprise the requested data. At step 408, the requested data is restored using the identified metadata. In one embodiment, the restoration process reads the data blocks and copies the data blocks to a restoration point in a volume. Optionally, the restoration process may use the metadata and a backup job identifier coupled to each of the data blocks in order to restore the requested data. The method 400 ends at step 410.

While the foregoing is directed to embodiments of the present invention, other and further embodiments of the invention may be devised without departing from the basic scope thereof, and the scope thereof is determined by the claims that follow.

The invention claimed is:

1. A method comprising:
   receiving a control message at a first node, wherein
      the control message is received from an active control node, and
      the control message indicates that a tape drive should be configured for concurrent access; and
   in response to the receiving the control message, configuring the tape drive for concurrent access by the first node and a second node, wherein the tape drive is configured to receive a first write operation directly from the first node,
the tape drive is configured to receive a second write operation directly from the second node, and
the tape drive is configured to receive the first write operation concurrently with receiving the second write operation.

2. The method of claim 1, further comprising:
coordinating performance of a plurality of backup jobs on the tape drive.

3. The method of claim 1, further comprising:
establishing shared access to the tape drive for a plurality of nodes.

4. The method of claim 1, wherein
the control message comprises a determination of a node to perform a backup job on the tape drive, and
the control message further comprises information regarding the node, the backup job, and the tape drive.

5. The method of claim 1, further comprising:
receiving a second control message, wherein
the second control message comprises information to establish a primary node of a plurality of nodes.

6. The method of claim 5, further comprising:
processing an image associated with a backup job, wherein the image comprises data to be written to the tape drive.

7. The method of claim 5, further comprising:
identifying metadata describing at least one backup job to be performed to the tape drive or a finished backup job.

8. The method of claim 7, wherein
the metadata describes locations of data on the tape drive, and
the data is associated with a backup job.

9. The method of claim 7, further comprising:
determining a position associated with the tape drive; and
writing the metadata to the tape drive after the position.

10. The method of claim 7, further comprising:
establishing exclusive access to the tape drive for the primary node;
writing the metadata to the tape drive; and
establishing shared access to the tape drive for the plurality of nodes.

11. The method of claim 1, further comprising:
receiving a second control message, wherein
the second control message comprises a designation of a second tape drive for use by a plurality of nodes.

12. The method of claim 1, wherein a data block to be written to the tape drive comprises a backup job identifier.

13. The method of claim 1, further comprising:
processing a request to restore data;
identifying metadata associated with the data within a plurality of tape drives; and
restoring the data using the metadata.

14. A memory device storing program instructions executable by a first node to:
receive a control message, wherein
the control message is received from an active control node, and
the control message indicates that a tape drive should be configured for concurrent access; and
configure the tape drive for concurrent access by the first node and a second node, in response to receipt of the control message, wherein
the tape drive is configured to receive a first write operation directly from the first node,
the tape drive is configured to receive a second write operation directly from the second node, and
the tape drive is configured to receive the first write operation concurrently with receiving the second write operation.

15. The memory device of claim 14, wherein the program instructions are further executable to:
establish shared access to the tape drive for a plurality of nodes, in response to the control message.

16. The memory device of claim 14, wherein the program instructions are further executable to:
receive a second control message, wherein
the second control message comprises information to establish a primary node of a plurality of nodes.

17. The memory device of claim 16, wherein the program instructions are further executable to:
identify metadata indicating locations of data on the tape drive, wherein
the data is associated with a backup job.

18. A system comprising:
a first node; and
a memory coupled to the first node, wherein the memory stores program instruction executable to
receive a control message, wherein
the control message is received from an active control node, and
the control message indicates that a tape drive should be configured for concurrent access; and
configure the tape drive for concurrent access by the first node and a second node, in response to receipt of the control message, wherein
the tape drive is configured to receive a first write operation directly from the first node,
the tape drive is configured to receive a second write operation directly from the second node, and
the tape drive is configured to receive the first write operation concurrently with receiving the second write operation.

19. The system of claim 18, wherein
the control message comprises a determination of a node of a plurality of nodes to perform a backup job on the tape drive, and
the control message further comprises information regarding the node, the backup job, and the tape drive.

* * * * *